United States Patent
Hardy et al.

(10) Patent No.: US 10,298,994 B2
(45) Date of Patent: *May 21, 2019

(54) USE OF NEAR FIELD COMMUNICATION (NFC) TO TRANSFER DVR TIMERS

(71) Applicant: DISH Technologies L.L.C., Engelwood, CO (US)

(72) Inventors: Christofer Hardy, Cheyenne, WY (US); Thomas Allan Yarborough, Cheyenne, WY (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/658,065

(22) Filed: Mar. 13, 2015

(65) Prior Publication Data

US 2015/0189361 A1 Jul. 2, 2015

Related U.S. Application Data

(63) Continuation of application No. 13/828,400, filed on Mar. 14, 2013, now Pat. No. 9,002,179.

(51) Int. Cl.
| | |
|---|---|
| *H04N 5/76* | (2006.01) |
| *H04N 21/4227* | (2011.01) |
| *H04W 76/14* | (2018.01) |
| *H04W 4/80* | (2018.01) |
| *H04N 5/765* | (2006.01) |
| *G11B 15/02* | (2006.01) |
| *H04N 21/4147* | (2011.01) |
| *H04N 21/422* | (2011.01) |
| *H04N 21/472* | (2011.01) |
| *H04N 9/88* | (2006.01) |

(52) U.S. Cl.
CPC ....... *H04N 21/4227* (2013.01); *G11B 15/023* (2013.01); *H04N 5/765* (2013.01); *H04N 21/4147* (2013.01); *H04N 21/4222* (2013.01); *H04N 21/47214* (2013.01); *H04W 4/80* (2018.02); *H04W 76/14* (2018.02)

(58) Field of Classification Search
CPC ......... H04N 21/47214; H04N 21/4334; H04N 5/76; H04N 9/88; H04N 40/18; H04N 60/27; H04H 40/18; H04H 60/27; H04H 2201/70
USPC ..... 386/291, 297; 455/3.02, 3.03, 3.05, 403, 455/418, 419

See application file for complete search history.

(56) References Cited

U.S. PATENT DOCUMENTS

| | | |
|---|---|---|
| 7,986,917 B2 | 7/2011 | Ahlgren et al. |
| 8,332,272 B2 | 12/2012 | Fisher |

(Continued)

OTHER PUBLICATIONS

Forum.Nokia, "Introduction to NFC," Nokia Corporation (Version 1.0), pp. 1-30, Apr. 19, 2011.

*Primary Examiner* — Daquan Zhao
(74) *Attorney, Agent, or Firm* — Seed IP Law Group LLP

(57) ABSTRACT

A mobile device running a mobile application accesses a remote content receiver to request the remote content receiver to retrieve a particular recording timer, and upon receiving the recording timer from the remote content receiver, establishes a radio communication link with a second mobile device and transfers the recording timer to the second mobile device over the established radio communication link. The radio communication link is preferably the Near Field Communication (NFC) link.

15 Claims, 4 Drawing Sheets

(56) References Cited

U.S. PATENT DOCUMENTS

| | | |
|---|---|---|
| 9,002,179 B2 | 4/2015 | Hardy et al. |
| 2002/0151271 A1* | 10/2002 | Tatsuji .................. H04H 60/91 |
| | | 455/3.05 |
| 2003/0143993 A1* | 7/2003 | Nagaoka ................ H04M 3/42 |
| | | 455/420 |
| 2008/0231492 A1 | 9/2008 | Hardacker et al. |
| 2009/0052863 A1 | 2/2009 | Parmar et al. |
| 2009/0286479 A1* | 11/2009 | Thoresson .......... H04M 1/7253 |
| | | 455/41.3 |
| 2010/0082784 A1 | 4/2010 | Rosenblatt |
| 2010/0146560 A1 | 6/2010 | Bonfrer |
| 2012/0220225 A1 | 8/2012 | Hill |
| 2012/0272273 A1 | 10/2012 | Grannan et al. |
| 2012/0289155 A1 | 11/2012 | Dua |
| 2012/0331500 A1 | 12/2012 | Hu |
| 2013/0243395 A1* | 9/2013 | Kummer ................ H04N 5/782 |
| | | 386/291 |
| 2013/0315569 A1* | 11/2013 | Ellis ...................... H04N 7/163 |
| | | 386/297 |

* cited by examiner

USE OF NEAR FIELD COMMUNICATION (NFC) TO TRANSFER DVR TIMERS

BACKGROUND

Technical Field

The present disclosure generally relates to data transfer between two mobile devices. In particular, the present disclosure is directed to the use of Near Field Communication (NFC) technology to transfer DVR timers and other information associated with program content between mobile devices.

Description of the Related Art

Mobile devices have become increasingly ubiquitous and relied upon for immediate communication, whether in the form of speech or data transfer. Standards in wireless communication are increasingly data driven to satisfy subscribers' expectation of more immediate access to data. The proliferation of smart devices, such as smart phones and tablets, make it imperative that any data is presentable on demand to the subscriber.

Many broadcast service providers have made it easier for their subscribers to access multimedia content from their mobile devices, streaming contents directly to the mobile devices or downloading data of a selected program content to the mobile device, by providing their subscribers with "apps" or a software application module that resides in the smart devices. Further, these providers also make it possible for the subscribers to use the same apps to remotely access and control their content receivers.

BRIEF SUMMARY

In accordance to one aspect of the present disclosure, a method for sharing a recording timer between two mobile devices is provided. The method includes a mobile device receiving, via a user interface, a selection of a recording timer stored in a remote audio/video receiver, and transmitting a request for the recording timer to the remote audio/video. The method further includes the audio/video receiver retrieving the stored recording timer and transmitting it to the requesting mobile device. Upon receipt of the recording timer, the mobile device establishes a radio communication with another mobile device and sends the recording timer to the other mobile device via the established radio communication. Preferably, the established radio communication is a Near Field Communication.

In accordance to another aspect of the present disclosure, a device for sharing a recording timer is provided; the device includes a first transceiving module to transmit and receive communication over a first communication channel, preferably a mobile communication channel. The device also includes a second transceiving module to transmit and receive communication over a second communication channel. In the preferred embodiment, the second communication channel is a Near Field Communication channel. The device further includes a processing module that executes instructions to present a user interface on the device, receive a user input selecting a recording timer stored in a remote audio/video receiver, generate a request to receive the recording timer, cause the remote audio/video receiver to retrieve the recording timer, receive the recording timer, establish a radio communication with a second device via the second communication channel, and send the recording timer to the second device via the established radio communication. The processing module may be further configured to cause a broadcast service provider to identify a content provider capable of providing the second program content if the second program content is not scheduled for broadcast to the audio/video receiver, and cause the broadcast service provider, upon identifying the content provider, to inform the audio/video receiver of the availability of the second program content from the content provider.

DETAILED DESCRIPTION

Figure 1:
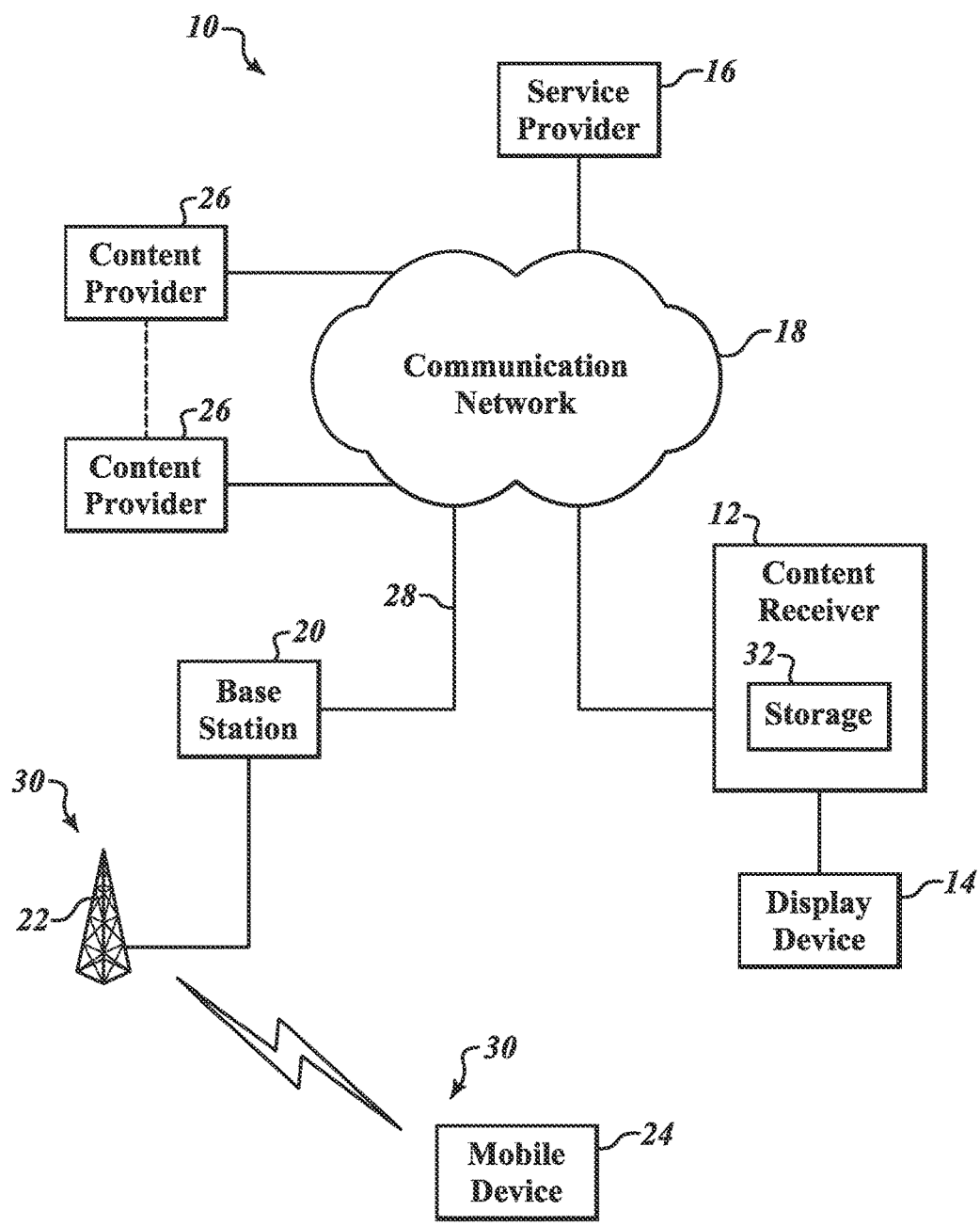
FIG. 1 illustrates an exemplary content distribution system in which content and other data can be exchanged between devices in the system.

In the following description, certain specific details are set forth in order to provide a thorough understanding of various embodiments of the disclosure. However, one skilled in the art will understand that the disclosure may be practiced without these specific details. In some instances, well-known interfaces have not been described in detail to avoid obscuring the description of the embodiments of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1 illustrates an exemplary content distribution system 10 that consists of a plurality of content providers 26, a service provider 16, a content receiver 12, a base station 20, and a mobile device 24 linked through a communication network 18. A display device 14 is coupled to the content receiver 12 and a cellular antenna 22 coupled to the base station 20 in FIG. 1. The communication network 18 itself includes wired and wireless media and their associated nodes. Communication network 18 may be a broadcast satellite network, a terrestrial broadcast network, cable network, internet protocol based computer network, telephony network, or a combination thereof.

Service provider 16 is configured to aggregate contents delivered by the plurality of content providers 26 over the communication network 18 and to provide the aggregated contents to at least one subscriber by transmitting signals to the content receiver 12. Service provider 16 may be a direct satellite broadcast service provider such as Dish Network and DirectTV, a direct cable broadcast provider such as Xfinity and Time Warner, and the like.

The base station 20 and its associated cellular antenna 22 are well known in the art and will not be discussed in detail in this disclosure. The base station 20 may be coupled to the communication network 18 via a backhaul using fiber optic or copper network. The cellular antenna 22 is configured to communicate with the mobile device 24 over a mobile communication network 30 using mobile communication standards such as 3G/UMTS, 4G, 4G/LTE and the like. Mobile communication standards are also well known in the art and will not be discussed in detail in this disclosure.

The content receiver 12 is configured to receive transmission signals and other information from the service provider 16 over the communication network 18. The transmission signal contains a plurality of program contents transmitted as audio, video and data streams. The content receiver 12 is also configured to send data to the service provider 16 over the communication network 18. Preferably, the content receiver 12 sends the data to the service provider 16 over an internet protocol based computer network, but sending the data over a telephony network is also contemplated.

The content receiver 12 is also configured to record the program contents received in the transmission signals, and to store the program contents in its storage 32 for subsequent retrieval and viewing. The storage 32 may be a hard disk drive, a solid state drive, an optical drive, and the like, or a combination thereof. A subscriber has an option to set up recording timers in the content receiver 12, indicating the program content to record and/or the time for recording the program content. In a preferred embodiment, the recording timers are stored in the storage 32. Storing the recording timers in another non-volatile memory location is also contemplated.

The content receiver 12 is further configured to output program content signals to the display device 14 for display. The output program content signals may be in an analog form or in digital form. In a preferred embodiment, the display device 14 is a television, but other display devices capable of presenting the program content to the subscriber are also contemplated.

In one embodiment, the content receiver 12 is a set top box with recording functionality that receives satellite transmissions via an antenna from a direct satellite broadcast service provider. The content receiver 12 may also be embodied in a presentation device, such as a television with an integrated tuner, or an IPTV receiver. In this disclosure, the content receiver 12 may be referred to as an audio/video receiver, a Digital Video Recorder (DVR), a television receiver, or a receiver.

A subscriber may control his content receiver 12 with a remote control. The subscriber may set one or more recording timers to record program contents that they want to watch later.

The mobile device 24 may be a cellular phone, a tablet, a portable computer, a multimedia player, and the like. Preferably, the mobile device 24 is a Smartphone. A Smartphone is a cellular phone with a mobile operating system that provides the Smartphone with more advanced computing capability than a standard cellular phone, also called "feature phone." A Smartphone combines the function of a cellular phone with at least a GPS, digital camera, and web browsers. With the mobile operating system and its APIs, a Smartphone can install and run applications, or "mobile apps."

The service provider 16 may provide one or more mobile apps to its subscribers to enable the subscribers to access to the services it provides via the subscribers' mobile devices 24. In a preferred embodiment, the service provider 16 provides the subscriber with a mobile app that allows the subscriber to access and control the content receiver 12, and to access and control his account; the subscriber can view an Electronic Program Guide, set up a recording timer for the content receiver 12, view or delete a recorded program content in the content receiver 12, check his account status, make a payment, change services, and so on. The mobile device 24 may have stored therein some or all of the recording timers currently stored at the content receiver 12, which is a set top box in one embodiment. Alternatively, the content receiver 12 may permit the mobile device 24 to access and download recording timers currently stored at the content receiver 12 via the mobile app 16 as described herein.

The subscriber preferably interacts with the mobile app through graphical user interfaces. The subscriber may enter his input through keypads, a gesture pad, a touchscreen, or by talking into a microphone. The term subscriber in this disclosure refers to a subscriber of the service provider 16. Generally, to use the mobile app, as well as to use the mobile device 24 to communicate over the mobile communication network 30, the subscriber also has to subscribe to, or pay for, the mobile services provided by a mobile network service provider. Examples of a mobile network service provider are AT&T Wireless, Sprint, Verizon Wireless, T-mobile and the like.

In one embodiment, when a subscriber accesses the content receiver 12 via the mobile app on the mobile device 24, the subscriber's commands are transmitted over the mobile communication network 30 and received by the cellular antenna 22 at the base station 20. The base station 20 sends the commands to the content receiver 12 via the communication network 18. The commands may be routed to the service provider 16 before they are sent to the content receiver 12, or the commands may be sent to both the service provider 16 and the content receiver 12. The mobile device 24 may also have the capability to access the communication network 18 directly, thus the subscriber's commands are sent to the content receiver 12 through the communication network 18 only, bypassing the mobile communication network 30, the cellular antenna 22 and the base station 20.

The mobile device 24 may receive program content and other data from the service provider 16, from the content receiver 12, or from both, via the communication network 18.

Figure 2:
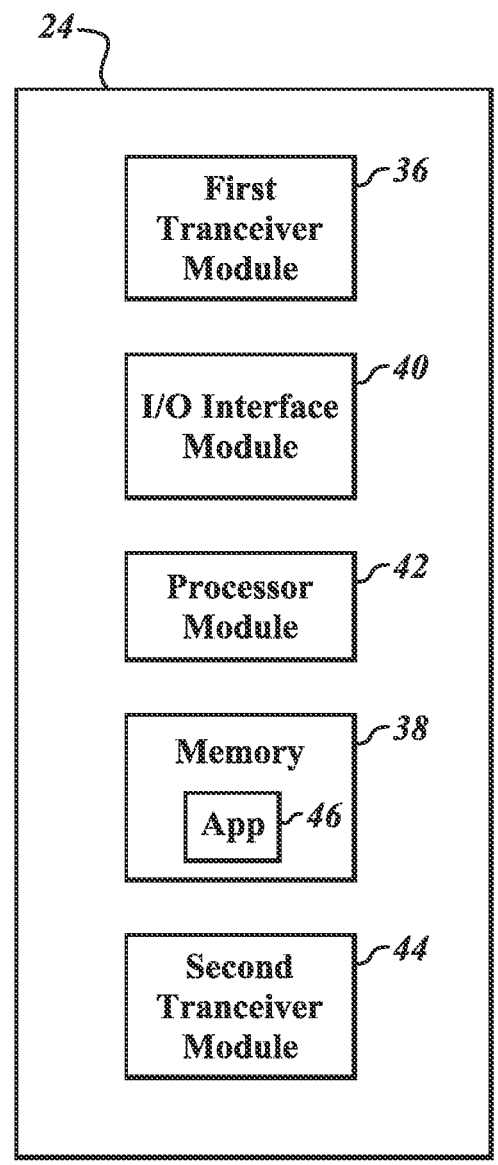
FIG. 2 shows a schematic block diagram of an exemplary mobile device used in one embodiment of the present disclosure.

FIG. 2 shows a block diagram of an exemplary mobile device 24 that includes a first transceiving module 36, a memory module 38, a processing module 42, a second radio transceiving module 44, and an input/output interface module 40. The mobile device 24 may include more modules than illustrated in FIG. 2. In a preferred embodiment, the first transceiving module 36 is configured to communicate with the base station 20 over the mobile communication network 30, the communication including exchanges of voice and data. In the preferred embodiment, the first transceiving module 36 includes transceivers and antenna compatible with at least one of the mobile communication standards previously discussed.

In the preferred embodiment, the processing module 42, coupled to the first transceiving module 36, is configured to process the communication received from the base station 20 and to configure the communication to be transmitted to the base station 20. The processing module 42 is also configured to run the mobile operating system and any mobile application installed in the mobile device 24.

The processing module 42 in FIG. 2 is also coupled to the input/output interface module 40 configured to receive and process an input from the subscriber. The input from the subscriber may be received via an entry on a keypad, touchscreen, gesture pad, or a microphone. It is also contemplated that the input/output interface module 40 also controls a haptic feedback output.

The memory module 38 is configured to store instructions to be executed by the processing module 42 such as instructions for the mobile operating system and any installed mobile applications. The memory module 38 includes at least a non-volatile memory device, such as Flash, SRAM or the like, and a volatile memory device such as DRAM and the like. The memory module 38 in FIG. 2 contains at least a mobile app 46 in its non-volatile device, the mobile app 46 configured to enable the subscriber to access his content receiver 12.

In FIG. 2, the second radio transceiving module 44 is coupled to the processing module 42 and is configured to establish a radio communication link directly with another device. The mobile device 24 is preferably establishing the radio communication link directly with another mobile device. Other mobile devices with which the mobile device 24 may establish the direct communication link have modules similar to those shown in FIG. 2; each of the other mobile devices having two or more transceiver modules and the capability to communicate over the established radio communication link. In a preferred embodiment, the second radio transceiving module 44 includes a Near Field Communication (NFC) transceiver. NFC is a well-known technology and will not be discussed in detail in this disclosure.

In an alternate embodiment, the mobile device 24 also includes a third transceiving module (not shown) configured for communication over an alternate radio frequency link, such as Bluetooth, Wi-Fi, ZigBee and the like.

Figure 3:
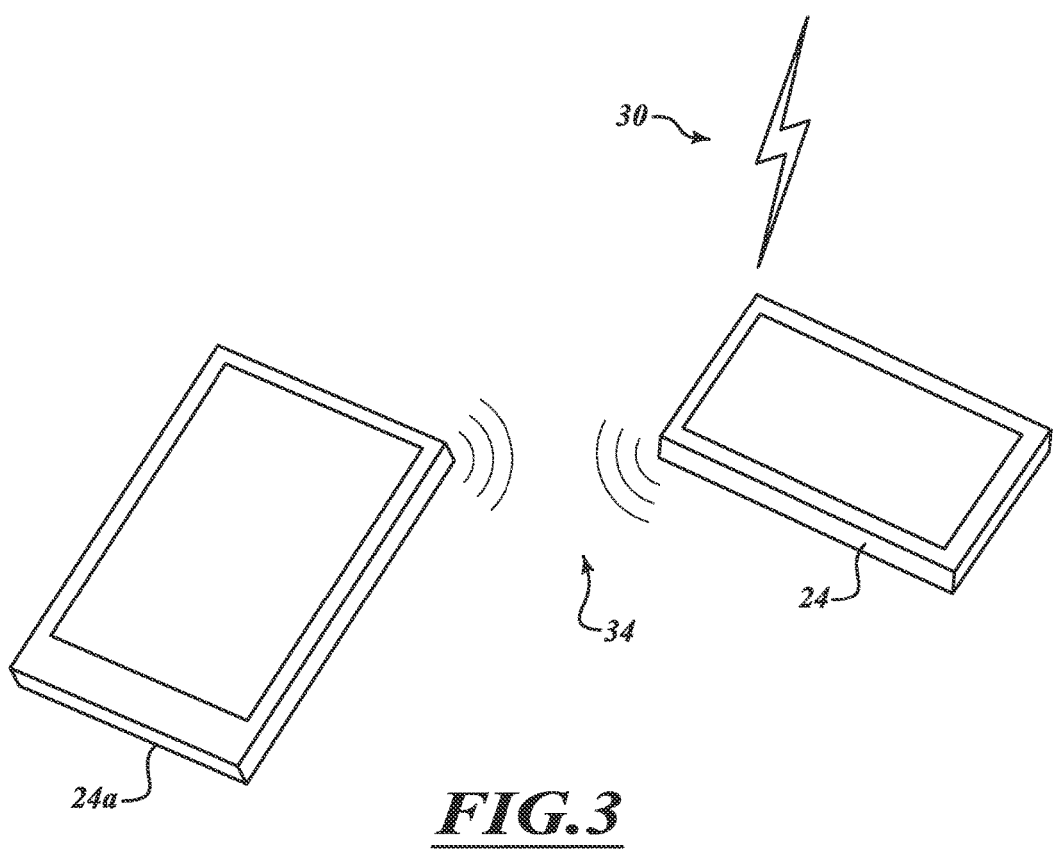
FIG. 3 illustrates two mobile devices exchanging data over a radio communication link.

FIG. 3 shows the mobile device 24 establishing a radio communication link 34 with another mobile device 24a that has similar functional modules as mobile device 24. A communication link 34 can be established between the mobile devices so that mobile device 24 can exchange data with the other mobile device 24a. The radio communication link 34 may be a communication link that uses a standard radio frequency protocol, such as NFC, Bluetooth, ZigBee, Wi-Fi, and the like. As previously discussed, NFC is preferred for the radio communication link 34. The mobile device 24 uses the NFC data exchange format to send a recording timer for a program content to the other mobile device 24a as explained in more detail later herein.

In another embodiment, the mobile device 24 is configured to use a first type of communication protocol to enable, pair, and establish a first radio communication link with the other mobile device 24a, and subsequent data exchanges are carried out over a second radio communication link using a second communication protocols different from the first type. For example, Bluetooth is used to locate and pair the mobile device 24 with the other mobile device 24a to both operate in communication with each other, and subsequent data transfers between the mobile device 24 and the other mobile device 24a use NFC protocol.

Figure 4:
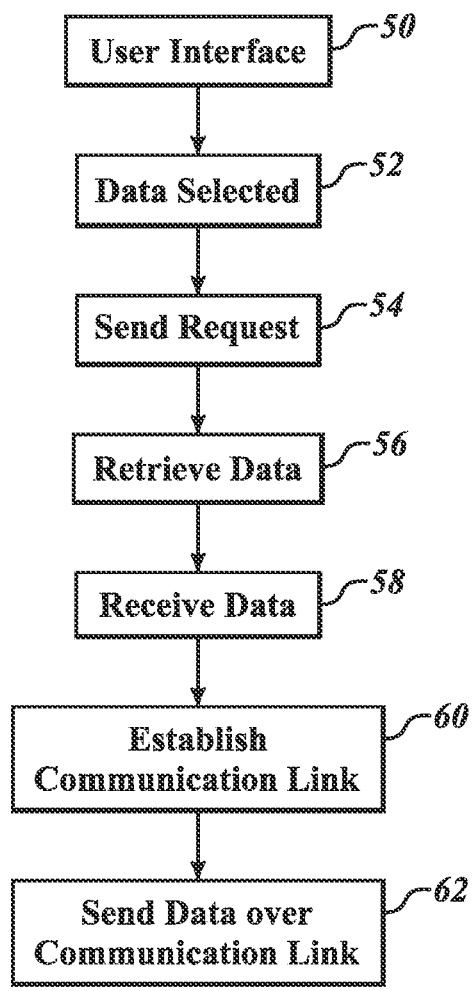
FIG. 4 illustrates a process flow diagram of a method according to one embodiment of the present disclosure for transferring recording timers between mobile devices.

FIG. 4 illustrates one embodiment of a process for exchanging data associated with content receiver 12, such as a recording timer, between mobile devices. A subscriber with a content receiver 12 has access to many different types of program contents on hundreds of channels. In one embodiment, the content receiver 12 is a set top box which is connected to a service provider such as a cable service provider, broadcast satellite service provider and the like that provides a large number of program contents from a number of content providers such as HBO and Showtime. The service provider may also offer a number of football channels as part of an NFL network, several college football channels, a number of specialty sport channels, as well as movie channels and the like. Subscribers regularly record their favorite TV shows. For example, some subscribers record all episodes of CSI, NCIS, or other investigative mystery TV program contents. Such episodes may be presented once a week, or in some cases, with reruns, may be presented once a day. Other subscribers may create recording timers to record other types of program contents, such as all college football games played by their alma mater, for example the Washington Huskies, or all movies starring Leonardo DiCaprio. At home, the subscriber uses his remote control to create various recording timers in the content receivers 12 so that the content receiver 12 is set to record the program contents that they wish to watch. Once created, the recording timers are stored in the content receiver 12 and can be subsequently retrieved, viewed on a display device, edited or modified.

Good friends frequently discuss various TV shows, movies, or other entertainment of interest with each other. For example, it is quite common for friends to discuss episodes of HBO's Game of Thrones, the next week's possible developments on True Blood or the previous Huskies football game when they meet at the office, in a carpool, or at the water cooler. One of the people in the discussion, Subscriber 1, may be recording one or all of the program contents being discussed: she has previously created recording timers for her content receiver to record all episodes of Game of Thrones, True Blood, and/or all Huskies football games. Another person in the discussion, Subscriber 2, however, while being a fan of the Huskies, is not sure how to find all of football games played by the Huskies in his own content receiver or digital video recorder (DVR) or how to create a recording timer in his content receiver or DVR to record all of the Huskies football games. According to principles of the embodiments discussed herein, the transfer of such recording timer can be done quickly and easily. Subscriber 1, who has created a recording timer in her content receiver to record all of the Huskies football games, can quickly, and easily, transfer that recording timer to Subscriber 2 so that Subscriber 2 can use that recording timer in his own content receiver. Subscriber 2's content receiver will then start recording the Huskies football games according to the recording timer. This can be done without Subscriber 2 having to create a new recording timer himself: Subscriber 2 does not have to personally search for the Huskies football games series in the program guide, or uses his remote control to program his content receiver step-by-step to record those football games. Creating recording timer may be very difficult for some subscribers to do.

Accordingly, a first subscriber who has a number of recording timers on her set top box offers to provide one or more of these recording timers to a second subscriber. The first subscriber takes her mobile device 24 and puts it adjacent to another mobile device 24a that belongs to the second subscriber who wishes to receive one or more of the recording timers which the first subscriber has previously set up. With simply invoking at least one mobile app and enabling the transfer, the first subscriber is able to transfer a selected recording timer, such as a recording timer for all of University of Washington Huskies football games, to the second subscriber on his mobile device. The other mobile device 24a will thereafter transfer the received recording timer to the second subscriber's content receiver at his home. The recording timer may be transferred through the base station 20 and the communications network 18. The first subscriber and the second subscriber may be subscribers of the same service provider or of different service providers. Various techniques by which this can be accomplished will now be described.

In one embodiment, the sequence of the process starts with a subscriber invoking the mobile app 46 on his mobile device 24, bringing up a user interface on the mobile device 24 in step 50. A particular recording timer is selected in step 52 and a request to have one or more recording timers currently stored in content receiver 12 transmitted to the mobile device 24 is generated. The mobile device 24 transmits this request to the content receiver 12 in step 54. The mobile device 24 may use the mobile communication network 30, the communication network 18, or a combination thereof to transmit the request to the content receiver 12. Upon receiving the request, the content receiver 12 retrieves the recording timer in step 56 stored in its storage 32 and sends it to the requesting mobile device 24 via the communication network 18. In one embodiment, the request is sent from the mobile device 24 to the content receiver 12 by way of the service provider 16, and the recording timer is sent from the content receiver 12 to the mobile device 24 by way of the service provider 16.

In some embodiments, the mobile device 24 may be configured to periodically download and store a recording timer list from the content receiver 12. The mobile device 24 may also synchronize its recording timer list that enumerates a plurality of recording timers stored in its storage location, with the content receiver 12. The mobile device 24 may download and/or synchronize the recording timer list and the plurality of recording timers in its storage location when the mobile device 24 is within a wireless range of the content receiver 12. In these embodiments, the mobile device 24 may transmit a recording timer already stored in its storage location to another mobile device without first contacting a content receiver 12.

In some other embodiments, a content receiver 12 may be configured to periodically transmit its recording timer list to the service provider 16. Thus, a mobile device 24 may alternatively query the service provider's server to obtain a recording timer, rather than the content receiver 12 as described in step 54 above.

In an alternative embodiment, the mobile device 24 requests the recording timers to be sent via the communications network 18 which is linked directly to the content receiver 12, and the mobile device 24 receives the recording timers from the content receiver 12 without interacting through the service provider 16. In yet another alternative embodiment, the mobile device 24 may be within a local network range of the content receiver 12. Specifically, the content receiver 12 may be able to communicate with a mobile device 24 via a short-range communication link such as Wi-Fi, Bluetooth, NFC, ZigBee and the like. The mobile device 24 therefore communicates directly with the content receiver 12 via the short-range communication link in the local network without using any other network and receives the recording timers via this short-range communication link.

Upon receiving the recording timer in step 58, a radio communication link 34 is established between the mobile device 24 and the other mobile device 24a in step 60, and the recording timer is transferred from the mobile device 24 to the other mobile device 24a in step 62. In one embodiment, Near Field Communication is the radio communication protocol utilized for establishing the radio communication link 34, although other radio communication protocols, such as Bluetooth, ZigBee and the like are also contemplated. While the operations in FIG. 4 are depicted as being executed in a particular order, other orders of execution of two or more operations may be possible.

Upon being received by the other mobile device 24a, the recording timer may be locally stored, or saved into the memory of the other mobile device 24a. The mobile device 24a can then send the recording timer to another content receiver, a client device, or digital video recorder for storage and subsequent use to select and record the program content designated in the recording timer.

In another embodiment, the subscriber can use the mobile app 46 on the mobile device 24 to create new recording timers using the mobile app's user interface. Once created, a new recording timer may be stored locally in the mobile device 24 and/or immediately sent to and stored in the content receiver 12 so that the content receiver 12 can timely record any program content indicated in the new recording timer. The locally stored new recording timer may further be transferred to the other mobile device 24a upon the establishment of the radio communication link 34.

The mobile device 24 receives at least two types of data via the base station 20 and the communications network 18. A first data type may be represented by the actual program content. This will usually be in the form of a streaming video of live or previously recorded program content or other data provided for watching the program content. A second data type, which may be quite different in format and size from the first data type, may be represented by a recording timer that is usually created and stored in the content receiver at the subscriber's home. A recording timer may be in a form of data file that describes the program content or contents to be recorded and the scheduled recording times.

A recording timer may also include instructions for a content receiver to search for and record selected program contents when they are provided through the communication network 18 to the content receiver 12. The recording timer may be in a form of a select-and-command type file, and may further include search functions to search for different kinds of program contents, look at the their metadata, and then issue commands to store the selected program contents in the storage device 32 associated with the content receiver 12. The second data type may be an executable file that can issue commands to the communication network, the content receiver 12 or, in some cases, to the service provider 16. The second data type may also include an ability to examine different types of data stored in the content receiver 12 and make heuristic decisions based on the examined data to identify future program contents and the commands to record or not record the identified program contents.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A first mobile device comprising:
   a first transceiving module configured to transmit and receive communication over a first communication channel;
   a non-volatile memory module configured to store instructions and data associated with execution of the instructions; and
   a processing module configured to:
   present a user interface on the first mobile device;
   receive a first user input selecting a first data via the user interface, the first data being a recording timer of a particular program content, the recording timer being associated with a first remote audio/video receiver;
   receive the first data;
   establish a radio communication link between the first mobile device and a second mobile device;
   send the first data from the first mobile device to the second mobile device via the established radio communication link, wherein the sending the first data from the first mobile device to the second mobile device causes the second mobile device to send the first data to a second remote audio/video receiver;
   cause a broadcast service provider to identify a content provider capable of providing the particular program content if the particular program content is not scheduled for broadcast to the second remote audio/video receiver, and
   cause the broadcast service provider, upon identifying the content provider, to inform the second remote audio/video receiver of the availability of the particular program content from the content provider, wherein the first mobile device helps a user of the second mobile device that receives the recording timer avoid having to search for content title or broadcast times of the particular program content to set up a recording timer on the second remote audio/video receiver.

2. The first mobile device of claim 1, further comprising:
   a second transceiving module configured to transmit and receive a communication via a second communication channel, wherein the first communication channel is a channel in an internet protocol based computer network, and wherein the second communication channel is a channel in a cellular network.

3. The first mobile device of claim 1 wherein the first communication channel comprises a cellular network.

4. The first mobile device of claim 1 wherein the processing module is further configured to:
   receive a second data from the second mobile device, the second data being information associated with a second program content from a second remote audio/video receiver;
   cause the first remote audio/video receiver to store the second data in a memory location of the first remote audio/video receiver; and
   cause the first remote audio/video receiver to record the second program content based on the second data when the second program content becomes available.

5. The first mobile device of claim 1, wherein the processing module is further configured to:
   generate a request to the first remote audio/video receiver to receive the first data over a first communication network; and
   cause the first remote audio/video receiver to retrieve the first data from a memory location in the first remote audio/video receiver.

6. The first mobile device of claim 1, wherein establishing the radio communication link includes:
   pairing the first mobile device with the second mobile device via a Near Field Communication protocol; and
   configuring the first mobile device and the second mobile device to send Near Field Communication Data Exchange Format messages to each other.

7. The first mobile device of claim 1, wherein the causing the second mobile device to send the first data to the second remote audio/video receiver includes causing the second mobile device to:
   establish a second communication link between the second mobile device and the second remote audio/video receiver;
   transmit the first data to the second remote audio/video receiver; and
   cause the second remote audio/video receiver to record a program based on the first data.

8. A system comprising:
   a first audio/video receiver including:
   a storage module; and
   a processing module configured to create a recording timer to record at least one program content in the storage module; and
   a first mobile device including:
   a housing;
   a battery within the housing that provides power for the first mobile device permitting it to be mobile; and
   a processing module within the housing and coupled to the battery, the processing module being configured to:
   present a user interface on the first mobile device,
   receive a first user input selecting a first data via the user interface, the first data being a first recording timer of a first program content, the first recording timer being associated with the first audio/video receiver,
   receive the first data,
   establish a radio communication link between the first mobile device and a second mobile device, the second mobile device being powered by a battery,
   send the first recording timer to the second mobile device over the established radio communication link between the first mobile device and the second mobile device, wherein the sending the first recording timer from the first mobile device to the second mobile device causes the second mobile device to send the first recording timer to a second remote audio/video receiver;
   cause a broadcast service provider to identify a content provider capable of providing the first program content if the first program content is not scheduled for broadcast to the second remote audio/video receiver, and
   cause the broadcast service provider, upon identifying the content provider, to inform the second remote audio/video receiver of the availability of the particular program content from the content provider, wherein the first mobile device helps a user of the second mobile device that receives the recording timer avoid having to search for content title or broadcast times of the particular program content to set up a recording timer on the second remote audio/video receiver.

9. The system of claim 8, the first audio/video receiver further including a transmit module configured to send the first data via a first communication network.

10. The system of claim 9, wherein the first mobile device further includes:
 a first transceiving module configured to transmit and receive data via the first communication network, and wherein
 the processing module is configured to request to receive the first data from the first audio/video receiver.

11. The system of claim 10, further comprising:
 a broadcast service center communicatively coupled to the first audio/video receiver, the broadcast service center including a processing module configured to send a plurality of program contents to the first audio/video receiver.

12. The system of claim 11, further comprising:
 a base station communicatively coupled to the broadcast service center and to the first audio/video receiver, the base station being communicatively coupled to the first mobile device via a second communication network, wherein
 the first mobile device further includes
 a second transceiving module configured to establish communication via the second communication network, and wherein
 the request to receive the first data is sent to the first audio/video receiver via the second communication network.

13. The system of claim 9 wherein the first communication network is an internet protocol network.

14. The system of claim 8, wherein establishing the radio communication link between the first mobile device and the second mobile device includes:
 pairing the first mobile device with the second mobile device via a Near Field Communication protocol; and
 configuring the first mobile device and the second mobile device to send Near Field Communication Data Exchange Format messages to each other.

15. The system of claim 8, wherein the second mobile device transmits the first data to the second audio/video receiver via a third communication network.

* * * * *